US012341685B2

(12) United States Patent
Hegar et al.

(10) Patent No.: US 12,341,685 B2
(45) Date of Patent: *Jun. 24, 2025

(54) RELIABLE PACKET DELIVERY THROUGH PATH DIVERSIFICATION

(71) Applicant: Amazon Technologies, Inc., Reno, NV (US)

(72) Inventors: Ryan Hegar, Happy Valley, OR (US); Gregory Truax, Portland, OR (US); Michael Cronk, Sherwood, OR (US); Paul S. Nahlous, San Anselmo, CA (US); Orlando Maldonado, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,192

(22) Filed: May 8, 2024

(65) Prior Publication Data

US 2025/0112853 A1 Apr. 3, 2025

Related U.S. Application Data

(63) Continuation of application No. 18/477,927, filed on Sep. 29, 2023, now Pat. No. 12,015,545.

(51) Int. Cl.
*H04L 45/24* (2022.01)
*H04L 45/12* (2022.01)

(52) U.S. Cl.
CPC ............ *H04L 45/24* (2013.01); *H04L 45/123* (2013.01)

(58) Field of Classification Search
None
See application file for complete search history.

(56) References Cited

U.S. PATENT DOCUMENTS

| | | | |
|---|---|---|---|
| 7,420,989 | B2 | 9/2008 | Liu |
| 8,385,224 | B2 | 2/2013 | Pasko |
| 10,447,578 | B1 | 10/2019 | Matthews |
| 10,484,925 | B1 * | 11/2019 | Chen ..................... H04W 40/16 |
| 11,750,318 | B1 | 9/2023 | Campos |
| 2002/0013840 | A1 | 1/2002 | Border |
| 2007/0076629 | A1 * | 4/2007 | Ashwood-Smith ..... H04L 45/26 370/254 |

(Continued)

OTHER PUBLICATIONS

Notice of Allowance issued in U.S. Appl. No. 18/477,927, dated.

*Primary Examiner* — Quang N Nguyen
(74) *Attorney, Agent, or Firm* — HOGAN LOVELLS US LLP

(57) ABSTRACT

Approaches are disclosed for providing path diversity in a data transmission network. A primary transmission path can be selected through a network, such as a backbone network, based on factors such as cost of transmission. At least one waypoint can be selected that is to be included in a secondary transmission path. The waypoint(s) can be selected such that the secondary transmission path will have few, if any, network components in common with the primary transmission path, providing significant path diversity. The waypoint(s) can be selected based on a cost ratio or other such factor. In the event of a failure of transmission of a data packet over one of the transmission paths, a second transmission attempt can be performed using the same path or the other transmission path, or both.

20 Claims, 7 Drawing Sheets

(56) References Cited

U.S. PATENT DOCUMENTS

| | | | |
|---|---|---|---|
| 2011/0060844 A1* | 3/2011 | Allan | H04L 12/66 |
| | | | 709/241 |
| 2015/0281331 A1* | 10/2015 | Steiner | H04L 67/1014 |
| | | | 709/203 |
| 2018/0213305 A1 | 7/2018 | Campos | |
| 2024/0259913 A1* | 8/2024 | Haustein | H04W 76/15 |

* cited by examiner

RELIABLE PACKET DELIVERY THROUGH PATH DIVERSIFICATION

CROSS-REFERENCE TO RELATED APPLICATIONS

This application is a continuation of and claims priority to U.S. application Ser. No. 18/477,927, filed on Sep. 29, 2023, which issued on Jun. 18, 2024 as U.S. Pat. No. 12,015,545, entitled "RELIABLE PACKET DELIVERY THROUGH PATH DIVERSIFICATION," which is hereby incorporated herein in its entirety and for all purposes.

BACKGROUND

For large networks that need to transport data across various geographic regions, there are typically a specific set of links used to transmit data over long distances. These links, often referred to as network backbone links, are generally high bandwidth and are used to transmit large amounts of data efficiently between different geographical locations or regions. Algorithms used to route data packets over these various network backbone links (and associated non-backbone links between a source and a destination) typically attempt to optimize for lowest cost, which in many instances corresponds to the shortest distance between the source and the destination, which helps to minimize latency and also reduce the amount of transmission resources needed to transmit packets on average. Various transmission protocols provide for at least some amount of path diversity in transmission, in order to provide alternative paths should there be an issue with a given path, such as congestion or a switch failure. Because routing is based on factors such as lowest cost options, however, these alternative paths will often share, or have in common, one or more network switches or other network transmission components, which does not provide for complete path diversity and can result in potential transmission failure in the event that one or more of these shared components becomes unavailable or otherwise experiences issue with timely and accurate packet transmission.

BRIEF DESCRIPTION OF THE DRAWINGS

Various embodiments in accordance with the present disclosure will be described with reference to the drawings, in which.

DETAILED DESCRIPTION

Figure 1A:
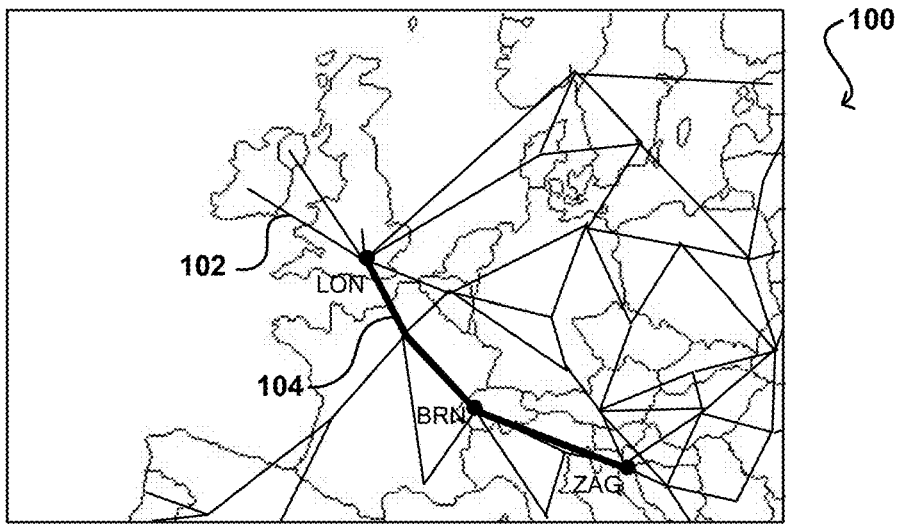
FIGS. 1A-1C illustrate network paths that can be used to route data in accordance with various embodiments.

Approaches described and suggested herein relate to the transmission of data or digital content across at least one network. In particular, various approaches provide for path diversity among primary and secondary transmission paths through a network, such as a backbone network. When transmitting data across geographical regions, for example, it may be necessary to use a long run, high capacity network, such as a backbone network. To reduce the probability of packet loss or delay due to a network failure along a primary transmission path, a secondary transmission path can be selected that includes different network components that are not subject to the same failure conditions as components of the primary path. As at least some routing decisions are made dynamically based on factors such as current network traffic, congestion, or link health, approaches presented herein attempt to ensure that secondary paths are selected that will have significant path diversity that takes these potential dynamic changes into account. In at least one embodiment, a primary transmission path through a network, such as a backbone network, can be selected based on one or more factors such as transmission cost (as may include latency, computing cost, resource consumption, and/or other such factors). In order to ensure a secondary transmission path has significant (if not total) diversity with respect to the primary transmission path, at least one waypoint can be selected through which the secondary path is to be routed, or where the secondary transmission path is to otherwise include the at least one waypoint. A waypoint can be selected such that any likely path selected through a network, such as from an ingress point to the waypoint and to an egress point of the backbone network, will have little to no overlap of network components with a primary path selected to go from the ingress point to the egress point of the network that does not need to go through that waypoint. An appropriate waypoint can be selected that not only maximizes (or otherwise provides significant) path diversity, but that also provides acceptable performance, such as to have an associated cost that satisfies a cost ratio threshold with respect to the cost of the primary transmission path. A packet can then be transmitted using either the primary or the secondary transmission path. If a packet is not successfully transmitted using one of these transmission paths, another attempt can be made to transmit the packet using the same transmission path and/or the other transmission path. As long as one instance of the data packet is received from either the primary or secondary transmission path, and satisfies any transmission criterion such as maximum latency, the data transmission can be determined to have completed successfully.

In the following description, various embodiments will be described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

As mentioned, the transmission of data across large geographic regions may utilize a network of primary transmission paths between selected locations in those regions. A backbone network can refer to a core portion of a computing or data network that connects multiple other networks, often allowing for data to be transmitted over large distances using high capacity data connections and network components. FIG. 1A illustrates a first view 100 of an example network of transmission links 102 that can be used to transmit data over such a region, in this example a portion of the European continent. It should be understood that the links shown are merely examples for explanation and do not necessarily correspond to actual links, cities, or other such actual features in a real world context. When data is to be transmitted from a source address in a source location to a destination address in a destination location, the data from the source address might first be transmitted to a local server, router, or entry point for this connected path network, and then transmitted across one or more links (or "path" segments) between network routers, switches, or other such devices, until arriving at an exit point for this connected path network, then being transmitted to the destination address. The entry (or "ingress") and exit (or "egress") points of this backbone network can in at least some embodiments be selected based at least in part upon physical proximity to the source and destination locations, in order to at least minimize latency of transmission. As will be discussed in more detail with respect to FIG. 2, data from a source address may be transmitted to a closest (at least by data transmission path) edge router of a backbone network, for example, and then transmitted across the backbone network to another edge router of the backbone network that is closest to the destination address. In the example of FIG. 1A, a source location in England might be transmitted to a backbone edge router in (or near) London, then transmitted via one or more intermediate servers, routers, or switches to be received by another backbone edge router in (or near) Zagreb, to be transmitted to a recipient destination in Croatia. It should be understood that there may be various other network routers, switches, and components used to route data between the backbone network and the source and destination locations that are not considered part of the backbone network.

As illustrated in FIG. 1A, there are many potential paths across the backbone network, and there are multiple links between backbone routers (or other such components) that can be used to route data between the London and Zagreb edge backbone routers. FIG. 1A illustrates an example path that passes through a backbone router in (or near) Bern. This path can be selected based at least in part upon being the shortest transmission path between the London and Zagreb routers for the path illustrated. Other paths may be selected as well, such as those that pass through Copenhagen or Warsaw, but these can be significantly longer runs that may come with undesired additional latency and higher risk of packet drop or other issues due in part to the longer transmission path and requirement for the data to pass through additional components or potential failure points.

As mentioned, such transmission paths can be selected to transmit various types of data with different transmission requirements. For media companies that attempt to transfer "live" streams of data for high profile channels and live events across large geographic regions, it is important not only to satisfy latency requirements but also to prevent loss or corruption of packets as there may not be sufficient time or capacity to retransmit packets over the live stream. When sending media over internal networks, or networks outside a backbone network, media companies may provision redundant paths to ensure zero interruption if one of the available paths within the internal network experiences a failure and/or congestion. Unfortunately, such network path diversity is not similarly guaranteed within various backbone networks (or other such large data transmission and/or network interconnecting networks). As mentioned, this may create difficulties if there is a network failure or other such occurrence that impacts the availability of key resources and may affect many paths or network devices in the backbone network. Network paths or links that are susceptible to concurrent outage due to such an event, or that "share fate" due to a common network failure, are often referred to as Shared Risk Link Groups ("SRLGs"). In some cases, failure of a key SRLG can result in intermittent packet loss over numerous network paths, such as label-switched paths ("LSPs"), and it may take a significant amount of time (e.g., on the order of minutes) for the network to rectify the problem. In other cases, even if a network device failure does not directly impact a number of flows, the subsequent induced traffic shifts to direct traffic around the failure can induce temporary packet loss and/or congestion on flows that were previously delivering packets reliably. For media content such as high profile live streaming event content, a delay on the order of tens of seconds or even minutes can be unacceptable to many recipients or consumers of the content, as well as providers of the content, advertisers of the content, and other such entities. Further, other data to be transmitted over those paths can be negatively impacted as well.

Approaches in accordance with various embodiments can attempt to reduce the potential loss of packets, or other issues negatively impacting data packets, transmitted between different geographic regions of locations over a backbone network, or similar high bandwidth, long run transmission network, at least in part by ensuring path diversity. In at least one embodiment, this can include ensuring that there are multiple independent paths for network traffic, or at least paths that are independent as possible (or practical for network constraints) given the topography of the backbone network. In at least one embodiment, the determination of appropriate independent paths can depend on various factors. A first factor can relate to real-time data acquired for the backbone network. Example real-time data can include current values for latency, available link bandwidth, interior gateway protocol (IGP) cost, and current SRLG status, among other such options. These and other such factors can be used to inform choices for path diversification within a given backbone network. As an example, a path selection algorithm can use this real-time data, along with any other relevant and available data, to intelligently select one or more "waypoints" that can be used to route traffic from an entry point to an exit point of the backbone network. In at least one embodiment, a "waypoint" can correspond to any computing or network device, physical or virtual, that can receive and transmit data packets over at least one path through a data network, such as a backbone network. A waypoint can be a device that receives a packet from a source (or earlier waypoint along a path) and then updates the destination address (e.g., IP address) to correspond to the destination address, or the address of the next waypoint if there are multiple waypoints, etc., and then forward the packet back onto the network. As an example, a computing instance or virtual machine hosted on a network server can function as a network waypoint. Packets can be directed to these waypoints to influence the routing of the packets, rather than sending the packets directly from the source to the destination. The transmission can take advantage of a network protocol (e.g., the user datagram protocol (UDP)) that is "aware" (or can be notified) of the available path diversification via one or more waypoints, and can allow for the intelligent and dynamic selection of traffic to pass through the individual paths to, for example, improve resiliency while efficiently using available network bandwidth.

In at least one embodiment, an algorithm can be used that attempts to optimize the selection of a primary path and at least a secondary path for transmission of data from an entry point to an exit point of the backbone network. A naive approach would be to send the traffic in opposing directions, such as "east and west" directions across the globe, to ensure path diversity, but such an approach can come with significant latency and other undesirable issues for at least time-sensitive data transmission. An approach in accordance with at least one embodiment can attempt to identify a path that shares a minimum number of network components (ideally no shared components if possible in at least one embodiment) which minimizing cost or otherwise ensuring transmission targets or requirements are satisfied by both the primary and secondary transmission paths (as well as any additional paths where more than two diverse paths are identified). As mentioned in more detail elsewhere herein, the "cost" of a path can refer to a number of different values, or combinations of values, as may relate to computing or resource operation cost, monetary operation cost, latency, distance, or other such values. In one embodiment, a path is selected that corresponds to a constrained shortest path (CSP), where there may be any of a number of allocated constraints, such as paths that satisfy latency requirements or avoid bottlenecks or congestion, etc. Cost may be calculated per link based on traffic engineering decisions or other such factors, such as to determine the shortest path with the highest capacity. In some embodiments, constraints or weights may be applied to attempt to balance cost with other factors, such as to attempt to minimize congestion or favor higher utilization across a network.

Figure 1B:
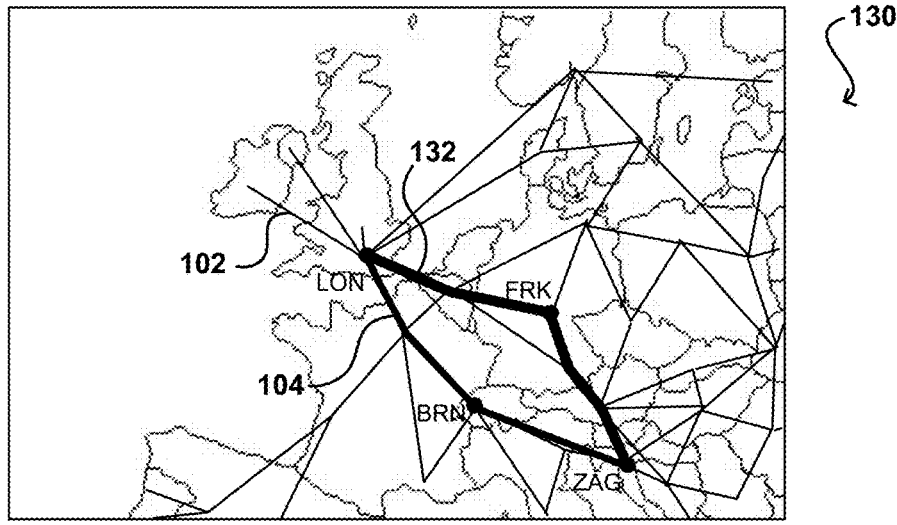

As an example, FIG. 1B illustrates another view 130 of the example backbone network where a secondary path 132 is selected that provides "complete" path diversity from the primary path 104 (at least between the source and destination edge routers or other common entry and exit points). In this example, both paths 104, 132 are to transmit data from a London-based edge router to a Zagreb-based edge router of the backbone network. As illustrated, the selection of paths does not include any common backbone links or components between (and other than) the start and ending points of the paths. In order to ensure that this diversity of paths is maintained even by network routers, switches, or other such components that can make dynamic routing decisions, at least one "waypoint" can be selected that prevents any dynamic decisions from routing traffic along a common path. As illustrated in FIG. 1B, a core backbone router in (or near) Frankfurt can be selected as a waypoint. The selection of the Frankfurt router as a waypoint ensures path diversity because no path through Frankfurt between London and Zagreb (unless backtracking is permitted) connects to a path between London and Zagreb that also passed through Bern. In this example, the primary path 104 passes through backbone routers in Paris and Bern. The secondary path 132 passes through backbone routers in Brussels, Frankfurt, and Munich. There are no connections between intermediate routers (e.g., Paris, Bern) of the primary path 104 and intermediate routers (e.g., Brussels, Frankfurt, Munich) of the secondary path, such that even if one of the routers makes a decision to select a different path due to a network issue (or other such factor), the different path will still have complete path diversity with respect to the primary path.

In at least one embodiment, a backbone network can include (or be associated with) a system or service such as a backbone data service (BBDS). A BBDS can provide interfaces, such as application programming interfaces (APIs), to inform a media source (e.g., a control plane of a media service) which backbone links will be used to send traffic between pairs of instances in, for example, different regions. The media source can then use this information from the BBDS to configure one or more "optional" waypoints between the source and destination that can be used for secondary (or additional) transmission path selection as needed (or otherwise determined to be beneficial). The addresses (e.g., Internet protocol (IP) addresses) of both the final destination and the optional waypoints can be handed off to the data plane of the media source when the flow of media data is started, and can be provided with periodic runtime updates. In at least one embodiment, the media data plane can use a protocol (e.g., the serverless application model (SAM) protocol) that can intelligently decide which packets to send over which path or route (e.g., the primary path or a secondary path through a selected waypoint). The bulk of the traffic can be sent directly from the source to the final destination over the primary path, such as the path that was determined to be the optimal or shortest path, or otherwise was selected using a determined cost or other such selection factor. When a packet needs to be re-tried, however, the protocol can cause the packet to be resent over a flow on the direct source-to-destination path, and can also send the packet to the waypoint(s) which will forward the packet with minimal delay on to the destination, and with maximum (or at least significant) path diversity. The final destination in at least one embodiment only needs to receive the packet over at least one of these paths within the provisioned latency window.

In at least one embodiment, an algorithm can attempt to select a primary path between a pair of sites or addresses based at least in part upon lowest determined cost (or another such selection factor or metric). The same algorithm (or a similar algorithm) can be used to select at least a secondary path between the pair that includes at least one waypoint guaranteeing that there are not any overlapping sites along the paths. This may include selection of one of a set of possible waypoints, or the best path for involving one or more selected waypoints, among other such options. In at least one embodiment, the selection of a secondary path may have to satisfy at least one selection criterion, such as a cost ratio, where the ratio of the cost of the secondary path through the waypoint(s) must be no greater than a maximum threshold of the primary path, such as no greater than 1.1× the cost of the primary path. In at least one embodiment, if a secondary path cannot be selected that satisfies such a criterion, then the algorithm can attempt to select a new primary path such that the secondary path satisfies the selection criterion, and the primary and secondary path both still satisfy any latency or other such criterion. In one example, a selection script when executed calculates the data for a large number (e.g., 240) of source and destination pairs between a number of regions (e.g., 10-20) where the media source transmits (or may transmit) content. In at least one embodiment, such a script can allow for a specification of possible types of devices to serve as waypoints, as may include not only servers or server instances, for example, but also devices such as point of presence devices (POPs) among other such options. An ability to use devices such as POPs can be beneficial as those may provide for a greater number of options with shorter associated path lengths. Further, a network may span many different geographic regions, and POPs are often positioned closer to the edges of the network, and thus closer to the source and/or destination locations. There may also be many more POP devices than edge routers or other such network components. Using network devices such as POPs allows for a much greater set of potential waypoints in a greater variety of locations.

Figure 1C:
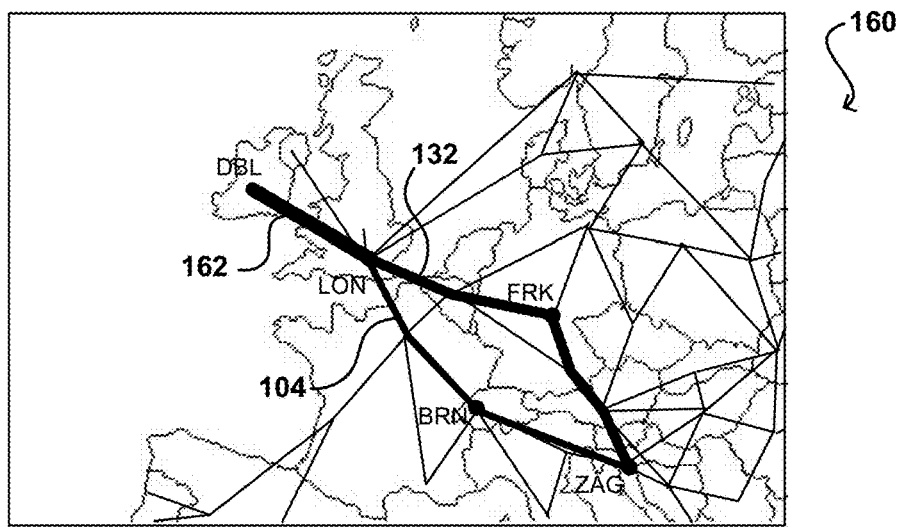

In some instances, complete path diversity may not be possible. As an example, FIG. 1C illustrates a situation where the source location is in (or near) Dublin rather than London. In this example, there may be only one backbone link from the city of Dublin in the backbone network, which connects to a backbone device in the city of London. It may then not be possible to select a separate secondary path through the backbone network from a source connecting in the city of Dublin that does not also connect to the network in the city of London, although there may be multiple flows or other potential mechanisms to provide at least some amount of path diversity in at least some instances. An example network may not provide for city diversity from a backbone perspective. In an instance where path diversity is not available over at least one link or portion of a network, the algorithm may still attempt to select a waypoint to maximize path diversity. The algorithm may still select Frankfurt as a waypoint as that will result in complete path diversity between London and Zagreb, as discussed with respect to FIG. 1B, but there will be at least some overlap due to the required shared use of the London backbone router. It should be understood that there may be some possibility for path diversity between Dublin and London in some embodiments, using separate switches or other such network components, but that due to the dynamic nature of routing decisions between Dublin and London such diversity may not be guaranteed. It may also be undesirable in at least some embodiments to restrict such dynamic decision capability, in order to avoid negatively impacting the system during normal operation. The algorithm may then still attempt to select an optimal primary and select a waypoint that satisfies any cost ratio or other such criterion, while still maximizing path diversity. In some embodiments, the selection algorithm may attempt to balance path diversity and cost, and the weighting of each may be user configurable or may depend in part upon current network conditions or other such factors.

In at least one embodiment, the implementation of waypoints to determine secondary paths can come with almost negligible cost to customers or users of the backbone network. Since only packet retries will be sent to the secondary path with the waypoint, there will not be any significant change to cost for normal operation. Regarding additional infrastructure, each waypoint can be multi-tenant, in that the network component serving as the waypoint can handle traffic from many accounts and flows rather than requiring an extra instance per flow. The code running on a waypoints need not be overly complex, as in at least one embodiment a waypoint can "dumbly" receive packets, extract the IP address of either the destination or the next waypoint, and forward the packet as appropriate. The simplicity of such an algorithm, along with one or more potential optimizations, can allow a single waypoint to handle tens of gigabits per second of data or more. Assuming an average flow to around 50 Mbps in one example, then a single waypoint could handle the retry traffic from around 400 flows. As long as waypoints do not require an increase to the overall latency (e.g., automatic repeat request (ARQ) latency) built into the transmissions then there should not be any noticeable, or at least significant, impact on users. The latency to receive and then forward traffic on a waypoint can be around 20 msec or less in at least one embodiment, which can be negligible compared with typical end-to-end ARQ latencies for cross region transfers, which can be on the order of around two seconds or more. There can also be higher latency for packets that are traversing a further network route. An important attribute then may not be the end-to-end latency but rather the difference between the latency of the direct path versus that of the packets traversing the waypoint(s). A worst case expectation may be on the order of around 500 msec in one embodiment, but 100 msec or less difference may be more likely, which is low enough that it will be unlikely to require an increase to the overall ARQ latency.

Figure 2:
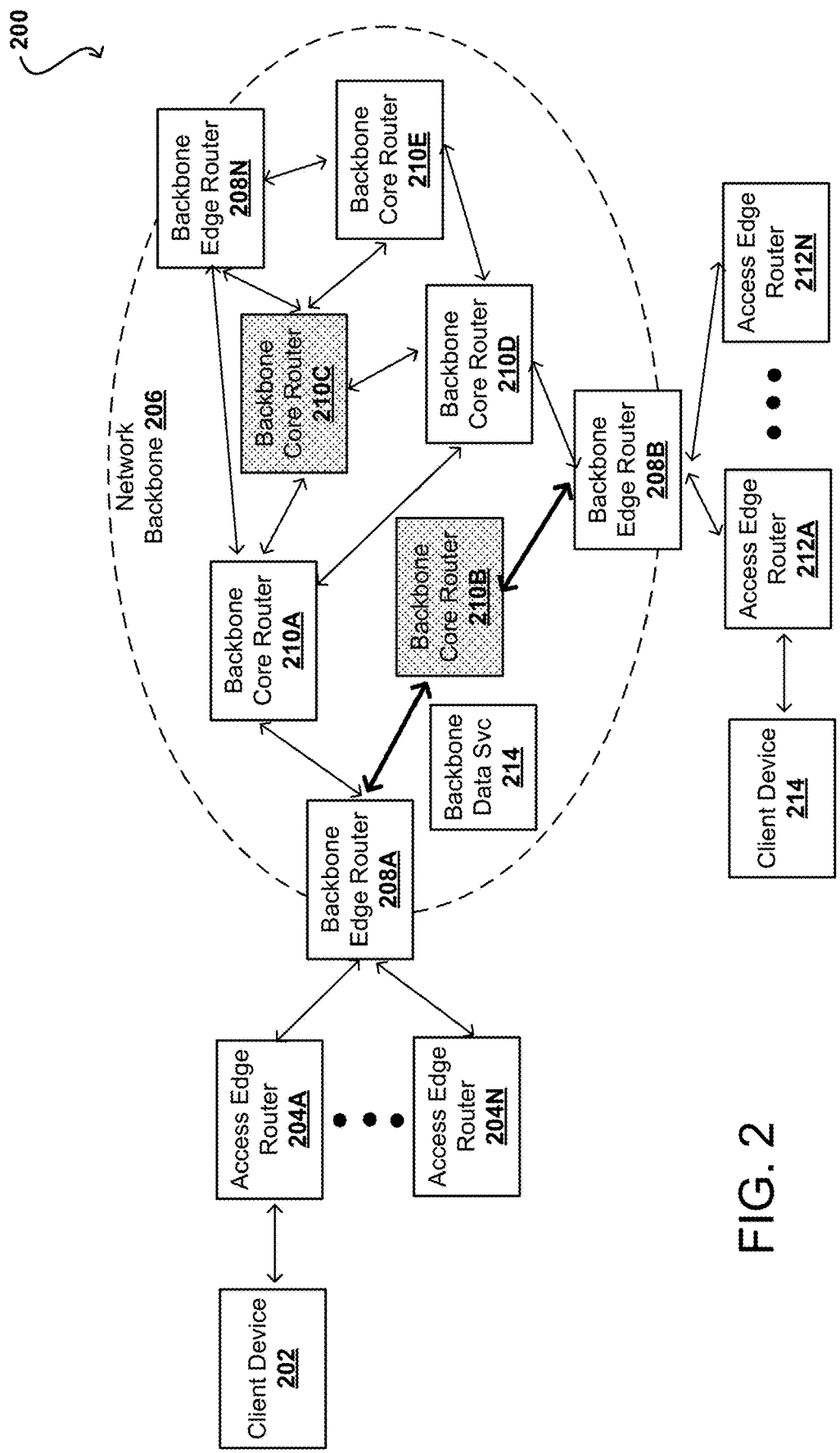
FIG. 2 illustrates an example network architecture, in accordance with various embodiments.

FIG. 2 illustrates an example data transmission network architecture 200 that can be used to transmit digital content in accordance with various embodiments. It should be understood that a client device 202 is illustrated as a source of a data packet and a client device 214 is illustrated as an intended recipient of the data packet, but there may be many other types of senders, recipients, or parties to a data transmission within the scope of the various embodiments. Further, the sender and recipient are illustrated to be outside the backbone network 206, such as in different networks or resource environments, but in other embodiments the sender and recipient may be inside the backbone network, in which case transmission paths may not pass through an ingress and/or egress device of the backbone network. Further, networks other than a backbone network can take advantage of aspects of the various embodiments as well.

In the example illustrated in FIG. 2, data packets are to be transmitted from a first client device 202 to a second client device 214 in a different geographical region or location. It should be understood, however, that there may be various types of sources of data or content to be transmitted, as well as various types of recipients, and data may be transmitted from more than one source and/or received by more than one recipient in more than one physical location, among other such potential variations. In this example, the data is to be transmitted between geographical regions, which involves transmission over a backbone network 206. In at least one embodiment, a source client device 202 will send data (or a request to send data) to an access edge router 204A of a data network, such as the Internet, an ethernet, or a cellular network. There may be many such access edge routers 204A-N available, and the client device 202 may be at least temporarily assigned to a specific access edge router 204A based on one or more selection factors, as may be based upon proximity, network load, connection availability, or other such factors. Data to be transmitted over the backbone network 206 can be transmitted from the access edge router 204A to a backbone edge router 208A providing an ingress point to the backbone network 206. In many instances, the backbone edge router 208A to function as an ingress point for a data packet from the source client device 202 will be selected based at least in part upon a proximity of the backbone edge router 208A to the client device 202 and/or access edge router 204A. In at least one embodiment, there may be a specific ingress point to the backbone network for a given geographical region, which may include one or more physical devices. Similarly, there may be a backbone edge router 208B to function as an egress point for the data packets to be transmitted to the recipient client device 214, where the recipient client device 214 may also receive the packet via an access edge router 212A, which may be one of a set of access edge routers 212A-N, offered by a network provider, which may be the same provider or a different provider from that which provided the access edge routers 204A-N used for the source client device 202. The egress backbone edge router 208B can also be selected based at least in part upon proximity, or at least one other such factor, to the recipient client device 214 and/or access edge router 212A. Other types of edge devices may serve as the ingress and egress points of the backbone network as well within the scope of various embodiments.

In order to transmit data from the ingress backbone edge router 208A to the egress backbone edge router 208B, the data will typically need to be transmitted through one or more backbone core routers 210A-E, as well as various other network components, such as switches, cables, load balancers, and the like. As mentioned, a system, service, component, or process such as a backbone data service 216 (or backbone data plane service) can attempt to determine one or more paths for the data through the backbone network. This may include, for example, using one or more algorithms, programs, code, machine learning models, or other such selection mechanisms for identifying potential paths and/or selecting an optimal, preferred, or beneficial path to use to transmit the data through the backbone network 206. In at least one embodiment, a cost determination and optimization process can be used, wherein the backbone data service 216 can determine various potential paths through the backbone network 206 from the ingress backbone edge router 208A to the egress backbone edge router 208B. The backbone data service 216 need not consider all possible paths, but may attempt to identify a subset of potential paths using one or more criteria, such as a number of shortest paths, paths of less than a maximum length or number of hops, or paths that pass through a closest set of core routers, among other such options. In this example, a cost algorithm is used by the backbone data service 216 to calculate a cost for each of these paths, and then use that cost (potentially along with other relevant and available information such as network load, link health, or network congestion) to select a primary path to use to transmit the traffic from the ingress backbone edge router 208A to the egress backbone edge router 208B. The cost can be calculated based on any of a number of different factors, such as distance, number of hops, capacity, bandwidth, availability, latency, and the like. Selection criteria other than cost can be used as well in other embodiments. In this example, the backbone data service 216 can select a primary transmission path based at least in part on cost that passes through a given backbone core router 210B and associated network components.

The backbone data service 216 can also attempt to provide for path diversity of transmission by determining a path through the backbone network 206 that would utilize none of the same backbone network components (or as few of the components as possible) between the ingress backbone edge router 208A and the egress backbone edge router 208B. In this example, the backbone data service 216 can attempt to identify one or more backbone core routers 210A, 210C-N (or other network waypoints) for which none of the network components along a transmission path between the ingress backbone edge router 208A and the egress backbone edge router 208B that passes through that backbone core router would have network components in common with the selected primary transmission path (bolded in FIG. 2). Selecting a waypoint instead of a specific secondary path allows the backbone network to make dynamic decisions based on factors such as those related to network traffic to route along different segments of the backbone network. If possible, the backbone data service 216 can select an appropriate waypoint such that even where there are dynamic changes in paths through the backbone network, the requirement to pass through the selected waypoint will still provide for path diversity.

In at least one embodiment, the backbone data service 216 can use the same cost function (or algorithm, trained model, etc.) to attempt to identify an appropriate waypoint as was used to select the primary transmission path. A different function or selection approach may be used for waypoint selection in other embodiments. In this example, a specific backbone core router 210C can be selected as a waypoint for a secondary transmission path for the data. The waypoint can function as a first destination to which a data packet needs to be routed, which can impact the selected transmission path through the backbone network. The primary transmission path will attempt to route the packet through the backbone network to the egress backbone edge router 208B, and will likely select a lowest cost path that passes through a first backbone core router 210B. If the first packet transmission fails for any reason, another attempt can be made to transmit the data packet through the network, which can involve another attempt at transmission along the primary path. In addition, the backbone data service 216 can cause another instance of the data packet to be transmitted along a secondary transmission path that passes "through" the selected waypoint(s), here including backbone core router 210C, and is directed to the egress point. The secondary path can pass through the waypoint by first being directed to the waypoint, then being redirected or forwarded from the waypoint to the egress point (or another waypoint if appropriate). In this example, the secondary path will have complete path diversity with respect to the primary path between the ingress and egress points, such that failure of a component or another such issue along the first path should not impact the availability of the secondary path, at least for many failure types. As long as at least one instance of the data packet is received by the egress backbone edge router 208B, the data packet can be forwarded on to the recipient client device 214. If instances of the data packet is received to the egress backbone edge router 208B along both the primary and secondary paths then one of the data packets (typically the first received) can be forwarded to the recipient client device 214 and the redundant instance can be discarded after being received by the egress backbone edge router 208B. In some embodiments, there may be a sequence of waypoints selected along a secondary path in order to ensure or increase path diversity. In other embodiments, there may be multiple waypoints selected if each waypoint would result in path diversity, and would satisfy any appropriate selection criteria, allowing dynamic decisions to be made as to the optimal waypoint at a given time. For example, in FIG. 2 any of backbone core routers 210A, 210C, or 210D could be selected as a waypoint without a significant increase in path length or cost.

Figure 3:
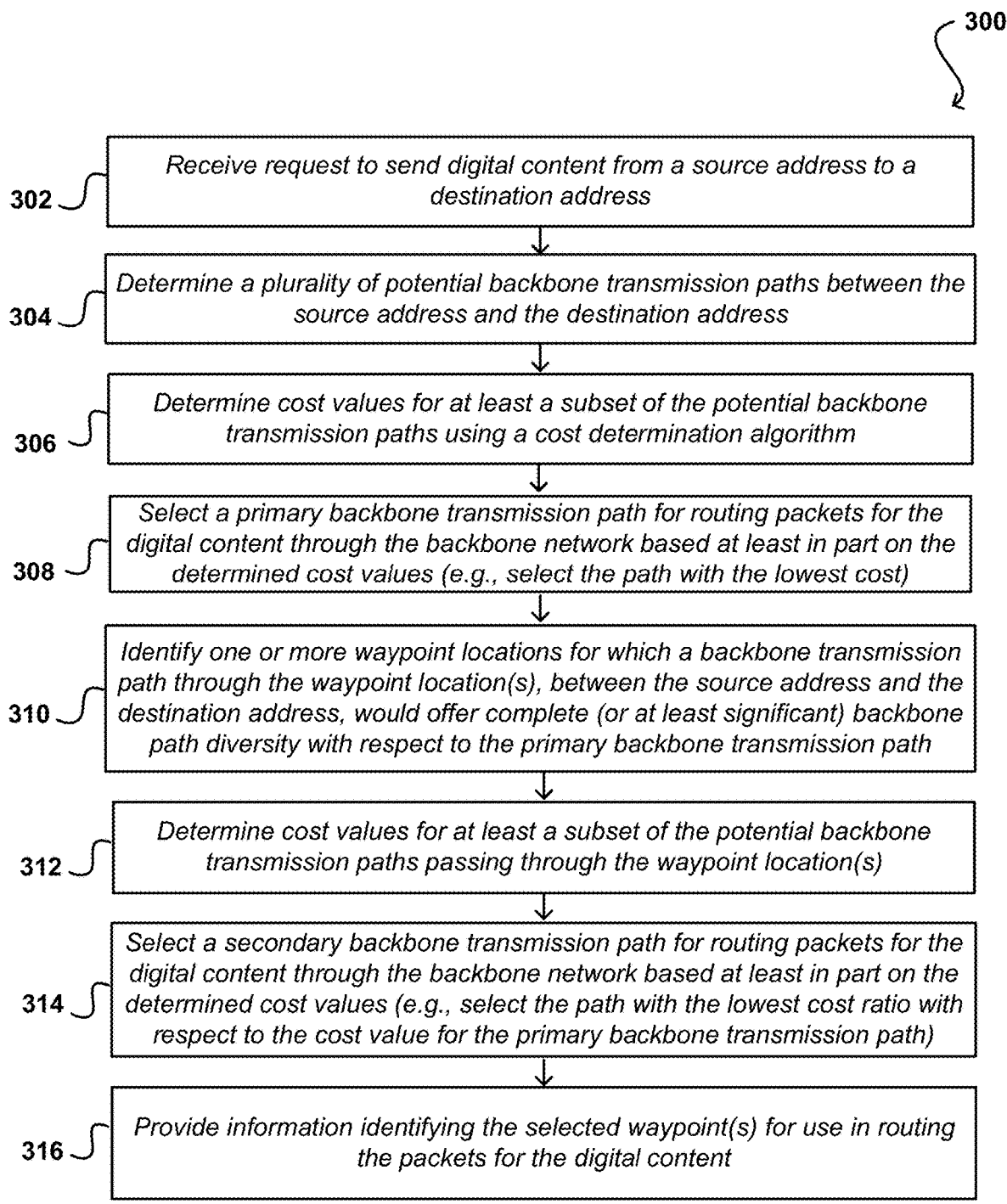
FIG. 3 illustrates an example process to select primary and secondary transmission paths with at least some amount of path diversity, in accordance with various embodiments.

FIG. 3 illustrates an example process 300 for selecting at least one waypoint to maximize path diversity that can be performed in accordance with at least one embodiment. It should be understood for this and other processes discussed and suggested herein that there can be additional, fewer, or alternative steps performed in similar or alternative orders, or at least partially in parallel, within the scope of the various embodiments unless otherwise specifically stated. Further, although discussed with respect to backbone networks, it should be understood that such approaches to ensuring and/or maximizing path diversity can be used with other types of transmissive networks or systems as well within the scope of various embodiments. In this example, a request is received 302 to send digital content from a source address to a destination address. This request can be received to a network edge device, data service, or other such recipient. Further, in some embodiments an initial data packet for the transmission may serve as the initial request. In this example, the transmission will require (or utilize) transmission over a backbone network. A plurality of potential backbone transmission paths can be determined 304 between the source address and the destination address, which may each have a specific ingress or egress point to be used for the backbone network, or may have more than one such point. If there are multiple such edge points available then one of those edge points can be selected for a primary transmission path. Cost values can be determined 306 for at least a subset of these potential backbone transmission paths, between the ingress and egress points of the backbone network, using a cost determination mechanism (e.g., an algorithm, application, operation, model, or process). A primary backbone transmission path can be selected 308 from among the potential paths through the backbone network based at least in part upon the determined cost values, such as by selecting a lowest cost or selecting a path with a lowest cost that still satisfies one or more transmission criteria (such as latency requirements), among other such options. This primary transmission path can be used to attempt to transmit the associated data packet(s) through the backbone network from the ingress point (e.g., the ingress backbone edge device) to the egress point (e.g., the egress backbone edge device).

In one embodiment, a label switched path (LSP) approach can be used to route a packet through a network. Such an approach can involve hashing the packets based on five values, for example, including the source and destination IP addresses, the source and destination ports, and an identifier for the protocol, such as UDP. If there are multiple potential paths of similar cost, the hash value can be used to pseudo-randomly determine which direction the packet will go, or how the path will continue. This can provide for some deviation between a source and a destination, but in many instances the paths will share at least some common elements of the network.

In this example, an attempt will be made to determine a secondary transmission path for the data that maximizes (or at least provides significant) path diversity with respect to the primary transmission path through the backbone network. One or more waypoint locations in the backbone network can be identified 310 for which a backbone transmission path, between the ingress and egress points, would offer complete (or at least significant) path diversity with respect to the primary data transmission path. In at least one embodiment, any network component of the backbone network that is able to receive and redirect data packets can be considered as a potential waypoint. Cost values (or values for similar metrics) can be calculated 312 for at least a subset of these potential backbone transmission paths through the identified waypoint location(s). At least one waypoint can be selected 314 that is associated with a secondary transmission path for routing packets through the backbone network, where the selection is based at least in part upon the determined cost values. The selected waypoint should provide path diversity, and also satisfy one or more cost criteria, such as to have a cost ratio less than a specified threshold with respect to the cost of for the selected primary path. In at least one embodiment, the waypoint(s) associated with the lowest cost ratio can be selected, although the cost ratio may also be balanced against one or more other relevant values or factors, such as network congestion or packet size. Information identifying the selected waypoint(s) for use in routing one or more packets for the digital content to be transmitted can then be provided 316 to a data service, or other such recipient or destination, as appropriate. An approach such as LSP can still be used with the secondary path, as the waypoint was selected to ensure LSP-induced diversity does not cause the primary and secondary paths to undesirably overlap.

In at least one embodiment, a waypoint may be selected along the primary path as well. As mentioned, there may be some dynamic changes in the primary transmission path performed at packet transmission time, and selecting a waypoint for the primary path can help to ensure that the primary path does not deviate to an extent to where it reduces path diversity with respect to the secondary transmission path. In some embodiments the primary and secondary waypoints can be selected as part of the same selection process in order to maximize efficiency and diversity together, as selecting the waypoints together can result in an average total cost being lower than if a waypoint is only selected for a secondary path based on a state-based primary path selection that can vary over time. Such an approach can also be used where a secondary path through a waypoint determined based on a primary path would otherwise not be able to satisfy latency or other transmission requirements.

Figure 4:
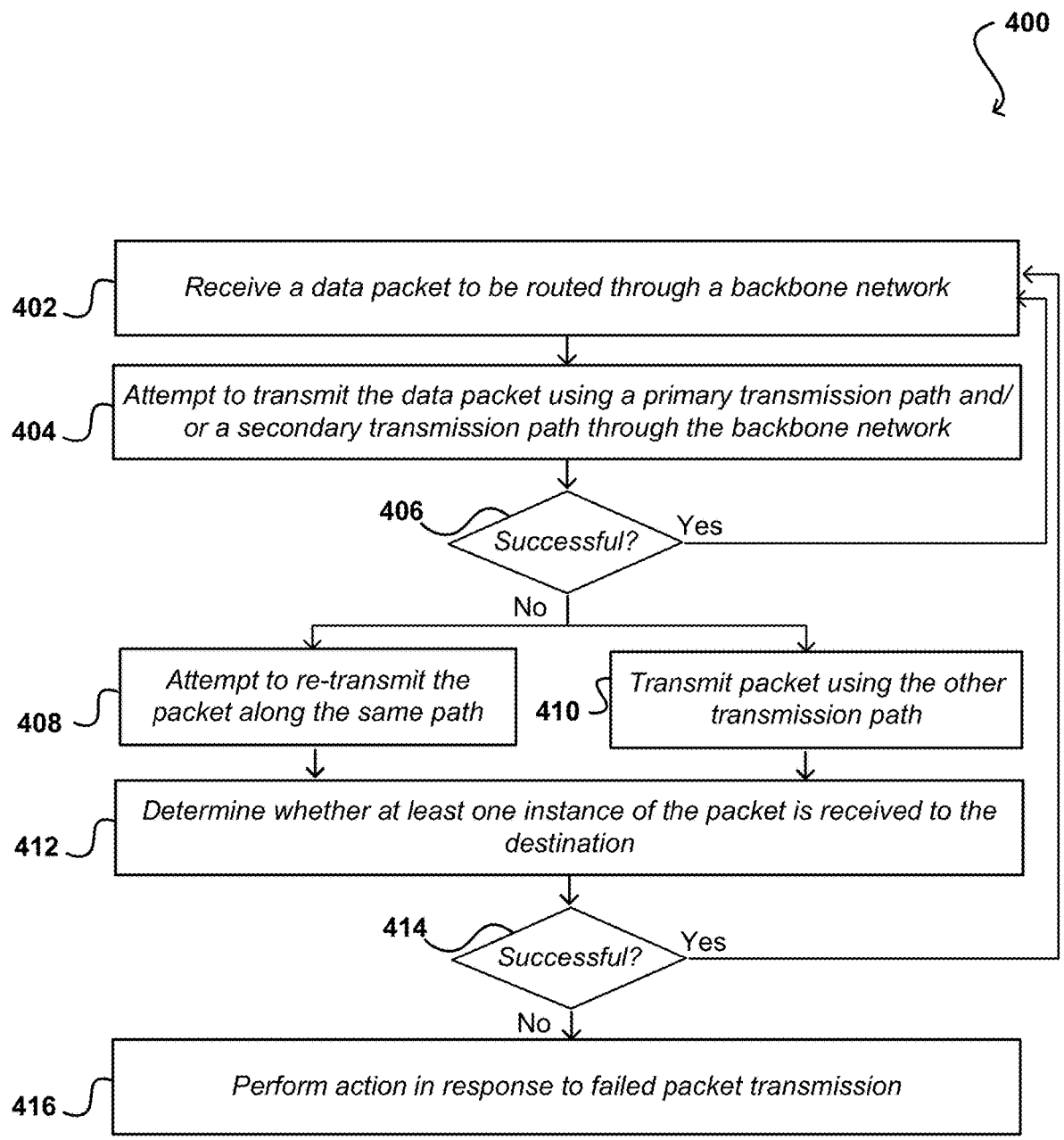
FIG. 4 illustrates an example process for attempting to ensure transmission of a data packet through a network, in accordance with various embodiments.

FIG. 4 illustrates an example process 400 to use such information to route packets through a backbone network, in accordance with at least one embodiment. This process may be performed by a backbone data service, for example, to route data packets through a backbone (or other such) network. In this example, a data packet is received 402, such as to an ingress edge router of a backbone network, that is to be routed through the backbone network, such as to an egress edge router. The data packet may be one of a sequence or stream of packets to be routed from a source address to a destination address via the backbone network, as well as network components that may reside external to the backbone network. The backbone data service can cause the backbone network components to attempt 404 to transmit the data packet along a primary transmission path and/or a secondary transmission path through the backbone network, where at least one waypoint is selected to provide at least some amount of path diversity between the primary and secondary transmission paths. As discussed with respect to the process of FIG. 3, this primary transmission path and/or secondary transmission path may be selected based at least in part on a determined transmission cost, among other such factors. There may be at least some dynamic adjustment made to the primary transmission path in at least one embodiment based upon factors such as current network load or congestion. A determination can be made 406 as to whether the transmission of the packet through the backbone was successful, such as whether the packet was received to a destination device of the backbone network and able to be transmitted along a path to the recipient address. If the transmission was successful then the process can continue for a subsequently-or next-received data packet.

If, however, the transmission of the data packet through the backbone network was determined to not have been performed successfully, then the data service can attempt 408 to re-transmit the data packet along the same transmission path through the backbone network. In this example, data service can also, or alternatively, attempt to transmit 410 a second instance of the data packet along the other transmission path through the backbone network. As discussed in more detail elsewhere herein, the secondary transmission path can involve at least one waypoint selected to attempt to maximize path diversity between the primary and secondary backbone transmission paths, in order to minimize the impact of a failure or issue with a component or process along the primary transmission path impacting the secondary transmission path, or at least to increase availability by providing a diversity of transmission path options. The data service can determine 412, such as through communication with a component (e.g., a backbone edge router) functioning as the egress point or destination device, whether at least one instance of the data packet was received and able to be successfully forwarded on toward the destination address. If the transmission was successful, then the process can continue for a subsequently or next received data packet. If the transmission want not successful then at least one action can be performed 416 in response to the failed packet transmission. There may be many possible actions which may vary between systems and embodiments, and which may also be user or system configurable. For example, there may be a minimum, maximum, or fixed number of retries available for a given packet. Different secondary (or even third or fourth) paths can be selected for subsequent retries. If the packet is determined to be unable to be transmitted successfully then an alarm might be generated to cause a person or system to attempt to analyze and address the problem. In other embodiments, at least one remedial action might be taken, such as to attempt to use a different ingress or egress point, use a different backbone network if available, try to route around the backbone network if possible, or take another such action. In some embodiments, the transmission of content may be paused until a test packet can be successfully transmitted through the backbone network between the ingress and egress points. Various other such actions, or combinations of actions, can be taken as well within the scope of the various embodiments.

Figure 5:
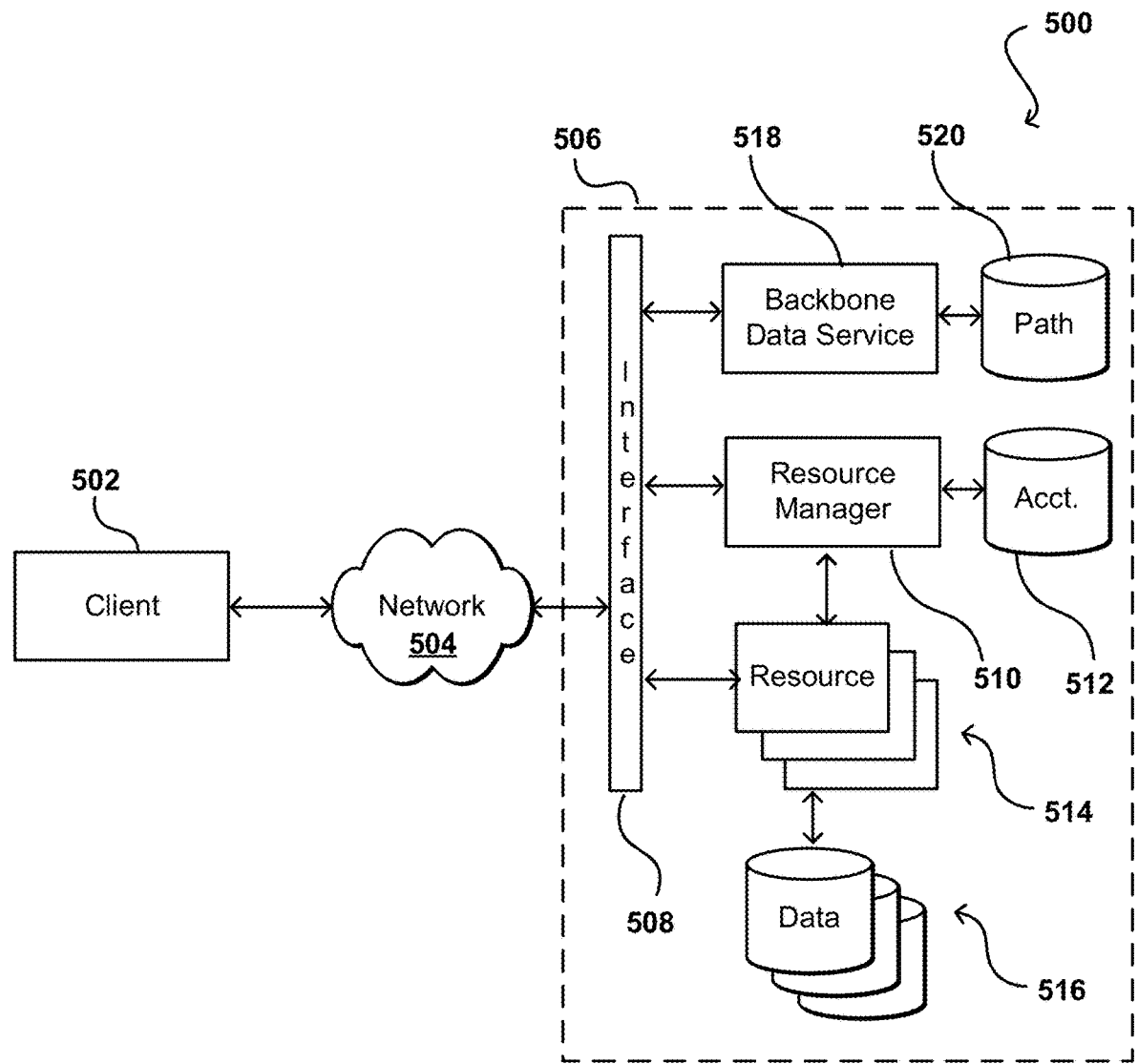
FIG. 5 illustrates an example network-inclusive computing environment in which aspects of various embodiments can be implemented.

FIG. 5 illustrates an example environment 500 in which aspect of various embodiments can be implemented. Such an environment can be used in some embodiments to provide resource capacity for one or more users, or users of a resource provider, as part of a shared or multi-tenant resource environment. For example, the provider environment 506 can be a cloud environment that can be used to provide cloud-based network connectivity for users, as can be used during disaster recovery or network optimization. The resources can also provide networking functionality for one or more client devices 502, such as personal computers, which can be able to connect to one or more network(s) 504, or can be used to perform network optimization tasks as discussed herein.

In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 can include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data can be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once a user (or other requestor) is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as can include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

In at least one embodiment, data may need to be transmitted over a backbone network. In this example, a backbone data service 518 (or data plane service) can determine cost values used to route data packets in at least one embodiment, and can determine waypoints to be used for secondary data transmission paths as discussed herein. The backbone data service 518 can also be responsible for tasks such as retransmission of failed packets, including transmission of additional instances through secondary paths determined according to those waypoints. The cost and other data may be calculated using path data stored to a path database 520 corresponding to an architecture of the backbone network, for example, along with other information such as real time traffic and congestion data for the backbone network.

Figure 6:
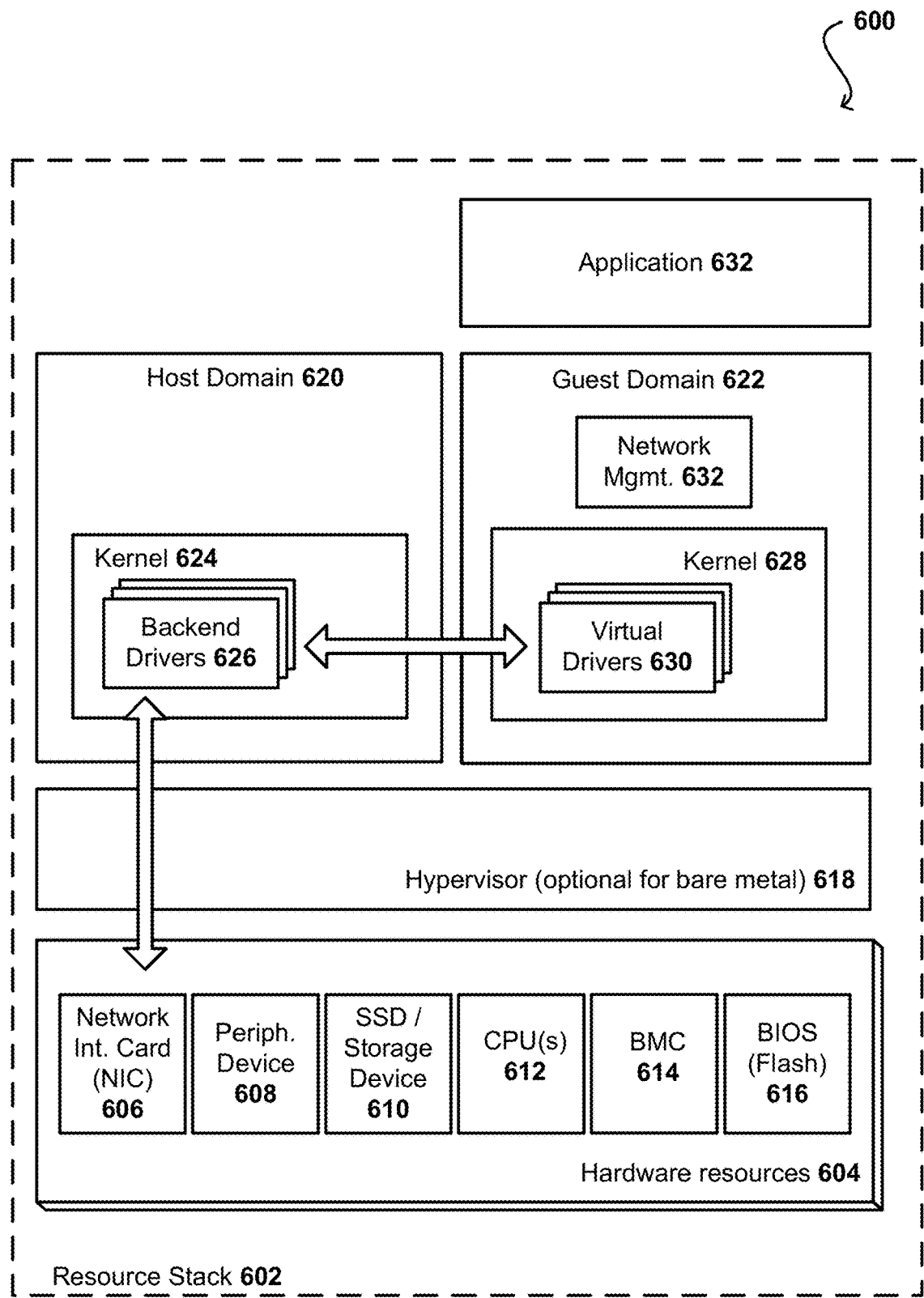
FIG. 6 illustrates example components of a server that can be utilized to perform at least a portion of a network management process, in accordance with various embodiments.

FIG. 6 illustrates an example resource stack 602 of a physical resource 600 that can be utilized in accordance with various embodiments, such as can be provided as part of a provider environment such as that illustrated in FIG. 5. Such a resource can be used as a network router, for example, which can be selected as a waypoint for determining a secondary transmission path or selected as part of a primary transmission path, among other such options. When performing tasks, such as network routing tasks using a routing application 632 or service, for example, such resources can include components such as CPUs 612 for executing code to perform these tasks, NICs 606 for communicating network traffic, and memory for storing instructions and networking data. In some embodiments, an entire machine can be allocated for these tasks, or only a portion of the machine, such as to allocate a portion of the resources as a virtual machine in a guest domain 622 that can perform at least some of these tasks.

Such a resource stack 602 can be used to provide an allocated environment for a user (or user of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack can include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 can perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 can have substantially native or "bare metal" access to the NIC 606 hardware, for example as provided by device assignment technology based on an IO Memory Management Unit (IO-MMU) device mapping solution like Intel VT-D. In such an implementation, there can be no virtualization layer (e.g., Hypervisor) present. The host domain, or OS, can then be provided by the user, with no guest domains utilized. Other technologies, such Single Root IO Virtualization (SR-IOV), can provide similar "bare metal" functionality to guest domains for only certain functionality of the devices. In general, in various other embodiments, the resource stack can comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I²C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS can keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
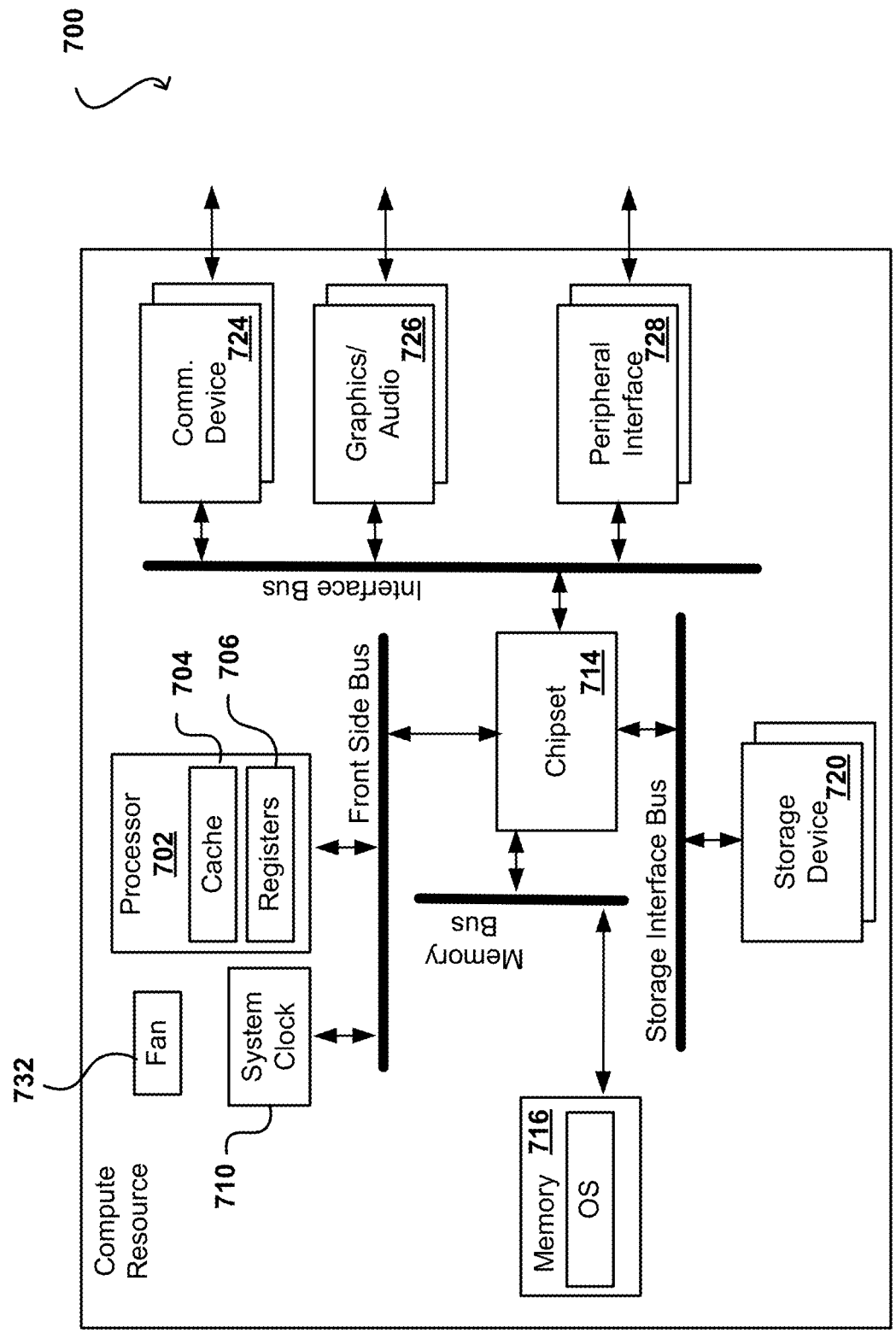
FIG. 7 illustrates example components of a computing device that can be used to implement network monitoring and management aspects of various embodiments.

Computing resources, such as servers, routers, smartphones, or personal computers, will generally include at least a set of standard components configured for general purpose operation, although various proprietary components and configurations can be used as well within the scope of the various embodiments. As mentioned, this can include client devices for transmitting and receiving network communications, or servers for performing tasks such as network analysis and rerouting, among other such options. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, which can include varying selections, numbers, and arguments of buses and bridges within the scope of the various embodiments. The data in memory can be managed and accessed by a memory controller, such as a DDR controller, through the coherency fabric. The data can be temporarily stored in a processor cache 704 in at least some embodiments. The computing device 700 can also support multiple I/O devices using a set of I/O controllers connected via an I/O bus. There can be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components can be located in different locations, etc.

An operating system (OS) running on the processor 702 can help to manage the various devices that can be utilized to provide input to be processed. This can include, for example, utilizing relevant device drivers to enable interaction with various I/O devices, where those devices can relate to data storage, device communications, user interfaces, and the like. The various I/O devices will typically connect via various device ports and communicate with the processor and other device components over one or more buses. There can be specific types of buses that provide for communications according to specific protocols, as can include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device can be used, for example, as a server in a server farm or data warehouse. Server computers often have a need to perform tasks outside the environment of the CPU and main memory (i.e., RAM). For example, the server can need to communicate with external entities (e.g., other servers) or process data using an external processor (e.g., a General Purpose Graphical Processing Unit (GPGPU)). In such cases, the CPU can interface with one or more I/O devices. In some cases, these I/O devices can be special-purpose hardware designed to perform a specific role. For example, an Ethernet network interface controller (NIC) can be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device can be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device can be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components can be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) can also be utilized. Additionally, in other embodiments, one or more of the computing device resource components can be virtualized hardware components emulated by the host device. In such embodiments, the I/O adapter device can implement a management process in which a host device is configured with physical or emulated hardware components based on a variety of criteria. The computing device resource components can be in communication with the I/O adapter device via the communication channel. In addition, a communication channel can connect a PCI Express device to a CPU via a northbridge or host bridge, among other such options.

In communication with the I/O adapter device via the communication channel can be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches can be controlled together or independently. For example, the I/O adapter device can selectively close a hardware latch for one or more components based on a trust level associated with a particular user. In another example, the I/O adapter device can selectively close a hardware latch for one or more components based on a trust level associated with an author or distributor of the executable code to be executed by the I/O adapter device. In a further example, the I/O adapter device can selectively close a hardware latch for one or more components based on a trust level associated with the component itself. The host device can also include additional components that are in communication with one or more of the illustrative components associated with the host device.

Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches can be controlled together or independently.

As discussed, different approaches can be implemented in various environments in accordance with the described embodiments. As will be appreciated, although a network-or Web-based environment is used for purposes of explanation in several examples presented herein, different environments can be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which can be chained or otherwise configured, which can interact to perform tasks such as obtaining data from an appropriate data store. As used herein, the term "data store" refers to any device or combination of devices capable of storing, accessing and retrieving data, which can include any combination and number of data servers, databases, data storage devices and data storage media, in any standard, distributed or clustered environment.

The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which can be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that can need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C#or C++ or any scripting language, such as Perl, Python or TCL, as well as combinations thereof. The server(s) can also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers can include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments can have numerous variations from that described above. For example, customized hardware might also be used and/or particular elements might be implemented in hardware, software (including portable software, such as applets) or both. Further, connection to other computing devices such as network input/output devices can be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A computer-implemented method, comprising:
    selecting at least one link, outside a first path between two hosts, to be included in a second path, the at least one link being selected at least in part to attempt to maximize at least partial diversity between the first path and the second path within one or more requirements; and
    sending traffic through at least one of the first path or the second path.

2. The computer-implemented method of claim 1, further comprising:
    calculating, using a cost determination algorithm, cost values for a plurality of potential paths; and
    selecting the first path based in part on a determined lowest cost value.

3. The computer-implemented method of claim 2, wherein the cost values are calculated based at least in part upon a distance of transmission or a latency of transmission for the plurality of potential paths.

4. The computer-implemented method of claim 1, further comprising:
determining cost values for potential second paths; and
selecting the at least one link based further upon the cost value for the respective second path, if sent through the at least one link, satisfying a cost ratio requirement with respect to the first path.

5. The computer-implemented method of claim 1, wherein the first path includes one or more traffic flows usable to send the traffic.

6. A computer-implemented method, comprising:
selecting at least one location, outside a first route through a network, to be included in a second route, the at least one location being selected at least in part to attempt to maximize at least partial diversity between the first route and the second route within one or more constraints; and
transmitting through at least one of the first route or the second route.

7. The computer-implemented method of claim 6, further comprising:
selecting the first route between an ingress location and an egress location of the network based, at least in part, upon a determined transmission cost for the first route.

8. The computer-implemented method of claim 6, wherein the first route and the second route are selected to be available to transmit between a sending location and a receiving location within the network.

9. The computer-implemented method of claim 6, further comprising:
selecting the at least one location further based on a determined transmission cost for the second route satisfying a cost ratio requirement with respect to the first route.

10. The computer-implemented method of claim 6, further comprising:
selecting a primary location through which the first route is to transmit, the primary locating selected to lower a probability of a portion of the first route intersecting the second route in the network.

11. The computer-implemented method of claim 6, wherein the first route includes one or more flows over which a transmission can be directed.

12. The computer-implemented method of claim 6, wherein a second attempt to transmit can be performed in an event of a failure of transmission, the second attempt able to be performed using at least one of the first route or the second route.

13. The computer-implemented method of claim 6, wherein the at least one location corresponds to at least one network component able to receive a transmission, modify a destination of the transmission, and forward the transmission according to the modified destination.

14. A system, comprising:
a processor; and
a memory device including instructions that, when executed by the processor, cause the processor to:
select at least one location, outside a first route through a network, to be included in a second route, the at least one location being selected at least in part to attempt to maximize at least partial diversity between the first route and the second route within one or more constraints; and
transmit through at least one of the first route or the second route.

15. The system of claim 14, wherein the instructions, when executed by the processor, further cause the processor to:
select the first route between an ingress location and an egress location of the network based, at least in part, upon a determined transmission cost for the first route.

16. The system of claim 14, wherein the first route and the second route are selected to be available to transmit between a sending location and a receiving location within the network.

17. The system of claim 14, wherein the instructions, when executed by the processor, further cause the processor to:
select the at least one location further based on a determined transmission cost for the second route satisfying a cost ratio requirement with respect to the first route.

18. The system of claim 14, wherein the first route includes one or more flows over which a transmission can be directed.

19. The system of claim 14, wherein a second attempt to transmit can be performed in an event of a failure of transmission, the second attempt able to be performed using at least one of the first route or the second route.

20. The system of claim 14, wherein the at least one location corresponds to at least one network component able to receive a transmission, modify a destination of the transmission, and forward the transmission according to the modified destination.

* * * * *